United States Patent
Adewole et al.

(10) Patent No.: US 10,889,743 B2
(45) Date of Patent: *Jan. 12, 2021

(54) METHOD FOR MAKING A DRILLING COMPOSITION AND TREATING A SUBTERRANEAN FORMATION

(71) Applicant: KING FAHD UNIVERSITY OF PETROLEUM AND MINERALS, Dhahran (SA)

(72) Inventors: Jimoh K. Adewole, Dhahran (SA); Musa O. Najimu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,205

(22) Filed: Sep. 9, 2019

(65) Prior Publication Data

US 2020/0002593 A1 Jan. 2, 2020

Related U.S. Application Data (63) Continuation of application No. 15/882,318, filed on Jan. 29, 2018, now Pat. No. 10,442,972.

(51) Int. Cl.
  *C09K 8/14* (2006.01)
  *C09K 8/18* (2006.01)
  (Continued)

(52) U.S. Cl.
  CPC .......... *C09K 8/145* (2013.01); *C09K 8/08* (2013.01); *C09K 8/18* (2013.01); *C09K 2208/04* (2013.01); *E21B 21/003* (2013.01)

(58) Field of Classification Search
  None
  See application file for complete search history.

(56) References Cited

U.S. PATENT DOCUMENTS

| 4,957,166 A | 9/1990 | Sydansk |
| 4,989,673 A | 2/1991 | Sydansk |

(Continued)

FOREIGN PATENT DOCUMENTS

| CN | 105385425 A | 3/2016 |
| WO | WO 2013/078374 A1 | 5/2013 |
| WO | WO 2017/087434 A1 | 5/2017 |

OTHER PUBLICATIONS

Musaed N.J. Alawad, et al., "Superior fracture-seal material using crushed date palm seeds for oil and gas well drilling operations", Journal of Kind Saud University—Engineering Sciences, 2017, 7 pages.

"Novel approach to improving efficiency", http://www.saudiaramco.com/en/home/innovation/stories-of-progress/novel-approach-to-improving-efficiency.html, Oct. 19, 2017, 1 page.

(Continued)

*Primary Examiner* — John J Figueroa
(74) *Attorney, Agent, or Firm* — Oblon, McClelland, Maier & Neustadt, L.L.P.

(57) ABSTRACT

A drilling fluid composition including a viscosifier, treated date pit particles which are i) de-oiled and ii) treated with a base or both a base and an acid, and an aqueous base fluid, wherein the treated date pit particles are present in an amount of 0.01-5 wt %, relative to a total weight of the drilling fluid composition. A method of making the drilling fluid composition by de-oiling date pit particles, treating with a base or a base and an acid in a freeze/thaw process, and adding the freeze/thaw mixture to the viscosifier and the aqueous base fluid. A process for drilling a subterranean geological formation with the drilling fluid composition.

2 Claims, 1 Drawing Sheet

(51) Int. Cl.
*C09K 8/08* (2006.01)
*E21B 21/00* (2006.01)

(56) References Cited

U.S. PATENT DOCUMENTS

| | | | |
|---|---|---|---|
| 6,016,879 A | 1/2000 | Burts, Jr. | |
| 9,416,306 B2 | 8/2016 | Savari et al. | |
| 10,442,972 B2 * | 10/2019 | Adewole | C09K 8/08 |
| 2006/0160907 A1 | 7/2006 | Stamp | |
| 2013/0206479 A1 | 8/2013 | Smith | |
| 2013/0288935 A1 * | 10/2013 | Rehage | B01D 11/0288 507/204 |
| 2014/0271928 A1 * | 9/2014 | Rehage | A01N 59/08 424/680 |
| 2016/0312100 A1 | 10/2016 | Amanullah et al. | |
| 2017/0058180 A1 | 3/2017 | Hossain et al. | |

OTHER PUBLICATIONS

Mohammed Wajheeuddin, et al., "Development of an Environmentally-Friendly Water-Based Mud System Using Natural Materials", Arabian Journal for Science and Engineering, vol. 5, No. 1, 2017, 8 pages (Abstract only).

Jimoh K. Adewole, et al., "Effect of Date Pit Based Additive on the Thermal Stability of Water-Based Drilling Fluid", 16 AICHE Annual Meeting, Nov. 13-18, 2016, 34 pages.

* cited by examiner

METHOD FOR MAKING A DRILLING COMPOSITION AND TREATING A SUBTERRANEAN FORMATION

CROSS-REFERENCE TO RELATED APPLICATIONS

The present application is a Continuation of Ser. No. 15/882,318, now allowed, having a filing date of Jan. 29, 2018.

STATEMENT REGARDING PRIOR DISCLOSURE BY THE INVENTORS

Aspects of this technology are described in Jimoh K. Adewole, Musa O. Najimu, "Oil Field Chemicals from Macromolecular Renewable Resources: Date Pit As a Case Study for Drilling Fluid Additive", AIChE Annual Meeting, Minneapolis Minn., Nov. 3, 2017, which is incorporated herein by reference in its entirety.

BACKGROUND OF THE INVENTION

Technical Field

The present invention relates to a drilling fluid composition that contains treated date pit particles as a rheological modifier, a density reducing agent, and a filtration control agent, and methods of making and using the same.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluid plays an important role in the successful drilling and completion of oil wells. The cost of drilling fluid is a major contributor to the overall cost of oil production. For this reason, research efforts have focused on developing cheap drilling fluid materials to reduce the cost of drilling.

Drilling fluids are mixtures of several chemical components that are used for a variety of purposes in drilling operations, such as fluid loss prevention, to provide stability under various operating temperatures and pressures, to provide stability against corrosion, flow, lubricity, electrical conductivity, alkalinity and pH control [Caenn, R., H. C. H. Darley, and G. R. Gray, *Chapter I—Introduction to Drilling Fluids, in Composition and Properties of Drilling and Completion Fluids* (Sixth Edition), 2011, Gulf Professional Publishing: Boston. p. 1-37]. Synthetic as well as natural polymeric additives are common additives to fulfill these property requirements. Environmental regulations have encouraged drilling contractors to employ the use of renewable non-hazardous additives [Hermoso, J., F. Martinez-Boza, and C. Gallegos, *Influence of aqueous phase vohme fraction, organoclay concentration and pressure on invert-emulsion oil muds rheology.* Journal of Industrial and Engineering Chemistry, 2015, 22: p. 341-349]. Natural polymers offer several advantages compared to synthetic polymers due to their economic impact, compatibility with many mud systems irrespective of water hardness, salinity and pH range, abundance, and environmental friendliness. Raw materials for producing natural polymers come from plants and agricultural products, and hence they are cheap and abundantly available.

Overbalanced drilling (OBD) is a well-known drilling method in the oil and gas industries, which involves maintaining a pressure in the wellbore that is higher than the static pressure of the formation being drilled. Using this technique, drilling mud is forced into the formation, which often leads to a decrease in the ability of the formation to transmit oil into the wellbore at a given pressure and flow rate. In underbalanced drilling (UBD), the pressure in the wellbore is kept lower than the static pressure of the formation being drilled. Thus, formation fluid flows into the wellbore and up to the surface unlike overbalanced drilling methods. The common practice is to separate the produced fluids at the surface. For this reason, UBD is a more expensive than OBD methods, and thus low-cost drilling fluids are needed to help offset these expenses.

Underbalanced wells have other advantages including the elimination of formation damage, increased rate of penetration due to less pressure at the bottom of the wellbore which makes it easier for the drill bit to cut and remove rock, and reduction in fluid loss [Steve, N., *Underbalanced Drilling, in Petroleum Engineering Handbook*, L. W. Lake, Editor, 2006, Society of Petroleum Engineers: Richardson]. Also, during underbalanced drilling operations, maintaining an underbalanced state until the well becomes productive can help to prevent drilling mud invasion into the formation. Consequently, formation damage can be completely avoided and lost circulation can be reduced.

In view of the forgoing, there is a need for drilling fluid compositions that can be tuned and used in different drilling operations (e.g., OBD and UBD) that include cheap, natural, readily available additives for control over fluid loss, density reduction, rheological properties, and corrosion prevention properties of the drilling fluids.

BRIEF SUMMARY OF THE INVENTION

Accordingly, it is one object of the present invention to provide novel drilling fluid compositions which include treated date pit particles and which have superior fluid loss, density reduction, rheological properties, and corrosion prevention properties.

It is another object of the present invention to provide novel methods of making the drilling fluid compositions.

It is another object of the present invention to provide novel processes of drilling subterranean geological formations using the drilling fluid compositions.

These and other objects, which will become apparent during the following detailed description, have been achieved by the inventors' discovery that treated date pit particles can be used as drilling fluid additives to bestow advantageous fluid loss, density reduction, and rheological properties to the resulting drilling fluids, and that these properties can be tuned by selection of a date pit particle treatment process for application in various drilling operations.

Therefore, according to a first aspect, the present disclosure relates to a drilling fluid composition that includes a) a viscosifier, b) treated date pit particles, which are i) de-oiled and ii) treated with a base or both a base and an acid, and c) an aqueous base fluid, wherein the treated date pit particles are present in an amount of 0.01-5 wt %, relative to a total weight of the drilling fluid composition.

In some embodiments, the viscosifier is bentonite.

In some embodiments, the viscosifier is present in an amount of 1-10 wt %, relative to a total weight of the drilling fluid composition.

In some embodiments, the treated date pit particles are ii) treated with a base. In some embodiments, the base is sodium hydroxide.

In some embodiments, the drilling fluid composition has a filtration water loss volume of 15-28 mL after 30 min under a pressure of 100 psi.

In some embodiments, the treated date pit particles are ii) treated with both a base and an acid. In some embodiments, the base is sodium hydroxide and the acid is acetic acid or sulfuric acid.

In some embodiments, the drilling fluid composition has a filtration water loss volume of 30-40 mL after 30 min under a pressure of 100 psi.

In some embodiments, the drilling fluid composition has a density of 6.5-8.5 lb/gal.

In some embodiments, the drilling fluid composition has a plastic viscosity of 3.0-3.5 cP.

In some embodiments, the drilling fluid composition further includes at least one additive selected from the group consisting of an antiscalant, a thickener, a deflocculant, a lubricant, a buffer, a biocide, and a weighting agent.

In some embodiments, the drilling fluid composition is substantially free of a fluid loss additive, a density reducing agent, and a rheology modifying agent, other than the treated date pit particles and the viscosifier.

According to a second aspect, the present disclosure relates to a method of making the drilling fluid composition, involving a) contacting dried date pit particles with an organic solvent to remove oils and form de-oiled date pit particles, b) mixing the de-oiled date pit particles with a base and water to form an alkaline mixture, c) subjecting the alkaline mixture to a freeze/thaw process and optionally adding an acid to form a freeze/thaw mixture comprising the treated date pit particles in water, and d) adding the freeze/thaw mixture to the viscosifier and the aqueous base fluid to form the drilling fluid composition.

In some embodiments, the organic solvent is at least one selected from the group consisting of pentane, hexane, methanol, and ethanol.

In some embodiments, the base is sodium hydroxide and the acid, when added, is acetic acid or sulfuric acid.

In some embodiments, the freeze/thaw process includes subjecting the alkaline mixture to a temperature of −20° C. or below for at least 4 hours to form a frozen mixture, thawing the frozen mixture at a temperature of 20-50° C., and agitating for at least 15 minutes to form the freeze/thaw mixture.

According to a third aspect, the present disclosure relates to a process for drilling a subterranean geological formation, involving drilling the subterranean geological formation with a drill bit to form a wellbore, and injecting the drilling fluid composition into the subterranean geological formation through the wellbore.

In some embodiments, the treated date pit particles are ii) treated with a base, and the drilling fluid composition is injected into the subterranean geological formation through the wellbore to maintain a pressure in the wellbore that is higher than a static pressure of the subterranean geological formation.

In some embodiments, the treated date pit particles are ii) treated with both a base and an acid, and the drilling fluid composition is injected into the subterranean geological formation through the wellbore to maintain a pressure in the wellbore that is lower than a static pressure of the subterranean geological formation.

The foregoing paragraphs have been provided by way of general introduction, and are not intended to limit the scope of the following claims. The described embodiments, together with further advantages, will be best understood by reference to the following detailed description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt %).

When referencing drilling fluid compositions, the phrase "substantially free", unless otherwise specified, describes an amount of a particular component (e.g., fluid loss additive) being less than about 1 wt. %, preferably less than about 0.5 wt. %, preferably less than about 0.1 wt. %, preferably less than about 0.01 wt. %, preferably less than about 0.001 wt. %, preferably 0 wt. %, relative to a total weight of the drilling fluid composition.

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the drilling fluid composition. The term "consisting of" describes aspects of the invention in which only those features explicitly recited in the claims are included and thus other components not explicitly or inherently included in the claim are excluded.

When referencing "treated date pit particles" herein, the term "treated" (or "chemically modified" (CM) or "modified") refers to chemical modification of date pit particles, by use of a base or a base and an acid in a freeze/thaw process, prior to mixing the date pit particles with other components to form a drilling fluid. Therefore, unless stated otherwise, the term "treated" is different from adding an acid or a base to an already formulated drilling fluid containing date pit particles, for example, to adjust the pH-T of the drilling fluid or to modify a plurality of components present in the already formulated drilling fluid.

The term "seed" or "pit" as used herein refers to any portion of the seed/pit, including the whole pit (i.e., the pit is used in its entirety), or any portion of the pit (e.g, the exterior shell of the pit), preferably the whole pit.

As used herein, the term "fatty" describes a long-chain hydrophobic portion of a compound made up of hydrogen and anywhere from 6 to 26 carbon atoms, which may be fully saturated or partially unsaturated, and optionally attached to a functional group such as a hydroxyl group or a carboxyl group. Fatty alcohols, fatty acids, fatty esters, fatty amides, and fatty hydrocarbon oils are examples of materials which contain a fatty portion.

Drilling Fluid Composition

Drilling fluids, also known as drilling muds, have many uses during drilling operations to tap underground collections of oil and gas. The main functions are to suspend and release cuttings, to assist in the removal of cuttings from the well, to seal off unwanted formations which may be encountered at different levels preventing the loss of drilling fluids to void spaces/porous formations, to lubricate the drilling tool, to control formation pressures, to assist formation fracking, to maintain the wellbore pressure and stability of the bore hole, to minimize formation damage, to transfer hydraulic energy to tools/bit, to ensure adequate formation evaluation (e.g., logging), and/or to facilitate cementing and completion. The drilling fluid compositions of the present disclosure can be advantageously formulated to possess rheological properties that enable their use in one or more of these applications depending on the specific needs of a drilling process. The drilling fluids herein are preferably useful for more than one of these applications, and are thus considered to be multi-functional.

The inventors have discovered a water-based drilling fluid which utilizes a readily available additive, i.e., date pit particulates, which are often considered an agricultural waste byproduct, useful for control of fluid loss, density reduction, modification of drilling fluid rheological properties, and corrosion prevention in various drilling applications. Such properties bestowed to the resulting drilling fluids can be easily tuned by selection of an appropriate date pit particle treatment process, to provide drilling fluids useful in overbalanced drilling (OBD) or underbalanced drilling (UBD) operations, as well as completion fluid operations. The drilling fluid composition of the present disclosure thus generally comprises, consists essentially of, or consists of a) a viscosifier, b) treated date pit particles, which are i) de-oiled and ii) treated with a base or both a base and an acid, and c) an aqueous base fluid.

Viscosifier

Viscosifiers may be included in the present drilling fluid to help modulate the rheological properties and to help improve the hole-cleaning, tool lubricating capability, solids-suspension capabilities of the drilling fluids, and/or to aid in the formation of mud cake to curtail drilling fluid invasion. In preferred embodiments, the viscosifier forms drilling fluids which are thixotropic, and thus are free-flowing, thin, less viscous when agitated, flowed, or otherwise stressed (time dependent shear thinning), but are thick or viscous and resistant to flow under static conditions such as when pumping is stopped. The viscosifier is preferably employed in an amount of 1-10 wt %, preferably 2-9 wt %, preferably 3-8 wt %, preferably 4-7 wt %, preferably 5-6 wt %, relative to a total weight of the drilling fluid composition, although amounts outside of these ranges may be used when drilling fluids having higher or lower viscosity are needed.

Exemplary viscosifiers that can be used herein include, but are not limited to, bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite and the like, as well as mixtures thereof. Natural polymers, such as xanthan gum (XC), *psyllium* husk powder (PHP), hydroxyethyl cellulose (HEC), carboxymethylcellulose, and polyanionic cellulose (PAC), as well as synthetic polymers, such as poly(diallyl amine), diallyl ketone, diallyl amine, styryl sulfonate, vinyl lactam, laponite, and polygorskites (e.g. attapulgite, sepiolite), including mixtures thereof, may also be used as viscosifiers.

Preferably, the viscosifier is bentonite, and more preferably, no other viscosifier is present besides bentonite (i.e., the viscosifier consists of bentonite). Bentonite is an absorbent aluminum phyllosilicate, impure clay made primarily of montmorillonite. Montmorillonite generally comprises sodium, calcium, aluminum, magnesium, and silicon, and oxides and hydrates thereof. Other compounds may also be present in the bentonite of the present disclosure, including, but not limited to, potassium-containing compounds, and iron-containing compounds. There are different types of bentonite, named for the respective dominant element, such as potassium (K), sodium (Na), calcium (Ca) and aluminum (Al). Therefore, in terms of the present disclosure "bentonite" may refer to potassium bentonite, sodium bentonite, calcium bentonite, aluminum bentonite, and mixtures thereof, depending on the relative amounts of potassium, sodium, calcium, and aluminum in the bentonite. In preferred embodiments where bentonite is present, said drilling fluids are considered to be clay-containing drilling fluids.

Treated Date Pit Particles

Date palm is a flowering plant species in the palm family, Arecaceae, cultivated for its edible sweet fruit known as a "date", which is a well-known staple food in North Africa, the Middle East and many other locations. The date pit (also called date seed) is an integral part of the date fruit, accounting for roughly 6-14 wt % of the total weight of the weight fruit. Date pits are often considered a waste byproduct of the date fruit, although sometimes they can be ground as used for animal feed. Date pits generally have the following composition: 5-15 wt % water (or 0.01-5 wt % water after drying), 0.5-2 wt % ash, 70-88 wt % carbohydrates (mainly hemicellulose, lignin, and cellulose), 2-8 wt % crude proteins, and 5-15 wt % fat content (i.e., fatty materials such as lipids, fatty esters, etc.), each relative to a total weight of the date pit. A typical date pit composition is provided in Table 1 (see Adewole, J. K. and A. S. Sultan, *A Study on Processing and Chemical Composition of Date Pit Powder for Application in Enhanced Oil Recovery*. Defect and Diffusion Forum, 2014. 353: p. 79-83—incorporated herein by reference in its entirety). In addition, date pits also typically contain 0.56-5.4 wt % lauric acid.

TABLE 1

Average Composition of Date Seeds

| Components | Contents (wt %) |
|---|---|
| Moisture | 10.20 |
| Ash | 1.18 |

TABLE 1-continued

Average Composition of Date Seeds

| Components | Contents (wt %) |
| --- | --- |
| Carbohydrate | 72.59-86.89, |
| Crude Proteins | 5.67 |
| Fat Contents | 5.02-12.67 |

Few research works have been published on the use of date pit as drilling fluid additive [Amanullah, M., et al., *Application of an indigenous eco-friendly rzm, material as fluid loss additive*. Journal of Petroleum Science and Engineering, 2016, 139: p. 191-197—incorporated herein by reference in its entirety], and none disclose the use of treated date pit particles. It has also been reported that date pit have excellent corrosion inhibiting properties both in the alkaline and acidic medium [Umoren, S. A., Z. M. Gasem, and I. B. Obot, *Natural Products for Material Protection: Inhibition ofM ild Steel Corrosion by Date Palm Seed Extracts in Acidic Media*. Industrial & Engineering Chemistry Research, 2013, 52(42): p. 14855-14865; Gerengi, H., *Anticorrosive Properties of Date Palm (Phoenix dactylifera L.)Fruit Juice on 7075 Type Aluminum Alloy in 3.5% NaCl Solution*. Industrial & Engineering Chemistry Research, 2012, 51(39): p. 12835-12843—each incorporated herein by reference in its entirety].

Date pit particles are formed by grinding date pits which have been preferably washed with water and dried. While the date pits can be ground to various sizes useful for making the drilling fluid compositions herein, typically the date pit particles have a largest dimension of less than 500 µm, preferably less than 400 µm, preferably less than 300 µm, preferably less than 200 µm, preferably 0.1-150 am, preferably 0.5-100 µm, preferably 1-75 µm, preferably 3-50 µm, preferably 5-40 µm, preferably 10-30 µm. Further, the date pit particles may be ground to any measure of roundness (i.e., very angular: corners sharp and jagged, angular, sub-angular, sub-rounded, rounded, or well-rounded: corners completely rounded) using visual inspection similar to characterization used in the Shepard and Young comparison chart, preferably the date pit particles are ground to a sub-angular, sub-rounded, or well-rounded roundness.

Date pit particles are categorized herein based upon the treatment method used during their manufacture, for example: Non-de-oiled date pit particles (ND) are date pit particles which have not been chemically treated or modified other than being washed with water, dried, and ground into particulates; De-oiled date pit particles (DO) are date pit particles which have been i) de-oiled; Treated date pit particles (chemically modified, CM) are date pit particles which have been both i) de-oiled and ii) treated with a base or both a base and an acid. Any of the above date pit particles can be employed in the present drilling fluids, however, de-oiled or treated date pit particles are preferably used, most preferably treated date pit particles are used. In preferred embodiments, date pit particles, preferably treated date pit particles, are present in the drilling fluid composition in an amount of 0.001-5 wt %, 0.01-4.5 wt %, preferably 0.05-4 wt %, preferably 0.1-3 wt %, preferably 0.2-2.5 wt %, preferably 1-2 wt %, relative to a total weight of the drilling fluid composition.

As will become more evident, date pit particles which have been subject to different treatment regimens have differing chemical compositions and also perform differently in drilling fluid compositions, thus providing drilling fluids with differing properties, and in some cases, drilling fluids which can be used for completely different drilling applications.

For example, non-de-oiled date pit particles have a composition substantially the same to the aforementioned date pit composition, albeit with a 0.01-5 wt %, preferably 0.1-4 wt %, more preferably 1-3 wt % water content (after drying), relative to a total weight of the non-de-oiled date pit particles.

De-oiled date pit particles have a lower fat content than non-de-oiled date pit particles since some or most fatty materials are removed during the de-oiling process to provide a fat content of less than 5 wt %, preferably less than 4 wt %, preferably less than 3 wt %, preferably less than 2 wt %, preferably less than 1 wt %, preferably less than 0.5 wt %, preferably about 0 wt %, relative to a total weight of the de-oiled date pit particles. Preferably, de-oiled date pit particles have a lower content of fatty esters and fatty hydrocarbon oils, and may have a lower content of fatty alcohols, fatty acids, and fatty amides compared to non-de-oiled date pit particles. Exemplary fatty alcohols include i-hexanot, 3-methyl-3-pentanot, 1-heptanol, 1-octanol, pelargonic alcohol, I-decanol, undecyl alcohol, lauryl alcohol, tridecyl alcohol, myristyl alcohol, pentadecyl alcohol, cexyl alcohol, pal mitoleyl alcohol, heptadecyl alcohol, stearyl alcohol, oleyl alcohol, nonadecyl alcohol, arachidy alcohol, heneicosyl alcohol, behenyl alcohol, erucyl alcohol, lignoceryl alcohol, ceryl alcohol. Fatty acids may include, but are not limited to, caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid Fatty hydrocarbon oils include saturated and unsaturated dodecane, saturated and unsaturated tridecane, saturated and unsaturated tetradecane, saturated and unsaturated pentadecane, saturated and unsaturated hexadecane, and the like, including branched-chain isomers of these compounds. Exemplary fatty esters are characterized by having at least one fatty aliphatic chain derived from a fatty acid, a fatty alcohol, or both Fatty esters herein may be monoesters of the formula $R^1COOR^2$ in which at least one of $R^1$ and R is an alkyl or alkenyl radical having 6 to 26 carbon atoms, preferably 7 to 24 carbon atoms, more preferably 8 to 22 carbon atoms, even more preferably 9 to 20 carbon atoms, yet even more preferably 10 to 18 carbon atoms, and where the sum of carbon atoms combined in $R^1$ and $R^2$ is from 7 to 52 carbon atoms, for example, cetyl octanoate and lauryl lactate. Diesters and triesters containing at least one fatty aliphatic portion are also considered to be fatty esters, for example, mono-, di-, and tri-glycerides, more specifically the mono-, di-, and tri-esters of glycerol and at least one fatty acid, for example, glyceryl mono-, di-, or tri-stearate, and palm stearin.

Figure 1:
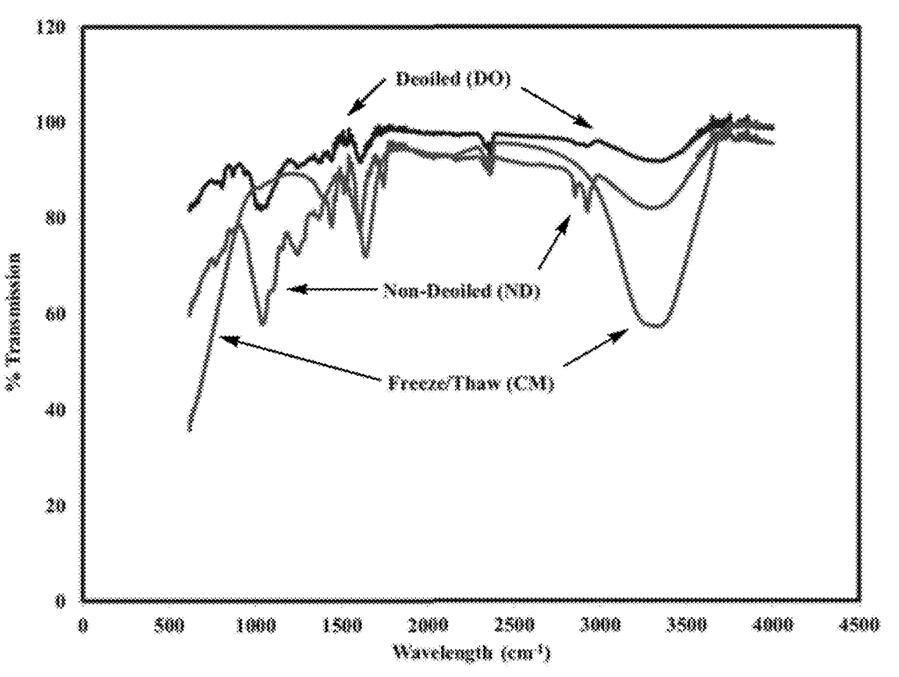
FIG. 1 is a FTIR spectrum indicating the change in chemical composition of date pit samples before and after treatment.

The comparative FTIR spectrum of FIG. 1 illustrates the chemical differences between the non-de-oiled date pit particles and the de-oiled date pit particles, for example, the de-oiled date pit particles have less IR absorption in the 1,000-1,500 $cm^{-1}$ (e.g., ether, alkane) and 2,800-3,100 (e.g., aromatic) regions. Indeed, de-oiled date pit particles have a minimum peak % transmission of greater than 75%, preferably greater than 80%, preferably greater than 82% in the 1,000-1,500 $cm^{-1}$ range and a minimum peak % transmission of greater than 95%, preferably greater than 97%, preferably greater than 99% in the 2,800-3,100 region. In comparison, non-de-oiled date pit particles have a minimum peak % transmission in the 1,000-1,500 cm$^{-1}$ and 2,800-3,100 regions of 55-65% and 80-90%, respectively.

Treated date pit particles, that is, date pit particles which have been both i) de-oiled and ii) treated with a base or both a base and an acid have a higher content of polar functional groups including, but not limited to, carboxylic acids, alcohols, and amines, compared to de-oiled date pit particles, likely owing to the cleavage of ester and amide bonds present in the date pits to form respective carboxylic acids, alcohols, and amines. For example, a total ester content in treated date pit particles is lower than the starting de-oiled date pit particles due at least in part to hydrolytic conversion of ester functionality into carboxylates and alcohols. The comparative FTIR spectrum of FIG. 1 illustrates the chemical differences between the treated date pit particles which have been ii) treated with a base, and the de-oiled date pit particles, for example, the treated date pit particles have a greater IR absorption in the 3,100-3,800 cm$^{-1}$ (e.g., O—H, N—H) region compared to the same IR region of both non-de-oiled and de-oiled date pit particles. Indeed, treated date pit particles have a minimum peak % transmission of 40-75%, preferably 50-70%, preferably 55-60% in the 3,100-3,800 cm$^{-1}$ range, compared to a minimum peak % transmission of 82-90% for non-de-oiled date pit particles and 90-98% transmission for de-oiled date pit particles in the 3,100-3,800 cm$^{-1}$ range, respectively.

In addition to the chemical differences between the various types of date pit particles (i.e., non-de-oiled date pit particles, de-oiled date pit particles, or treated date pit particles) the choice of date pit particles also influences the fluid loss, density reduction, fluid rheology, and corrosion properties when used as a component of drilling fluids. Thus, selection of an appropriate date pit treatment method can provide drilling fluids which are tuned to suit a particular application, such as, for example, overbalanced drilling (OBD), underbalanced drilling (UBD), and/or completion fluid operations.

In some embodiments, the drilling fluid compositions contain appropriate amounts of treated date pit particles, which are i) de-oiled and ii) treated with a base. Such drilling fluids preferably have a filtration water loss volume of 15-28 mL, preferably 16-27.8 mL, preferably 17-27 mL, preferably 18-26 mL, preferably 20-25 mL after 30 min under a pressure of 100 psi according to American Petroleum Institute (API) standard 13B-1 (ANSI/API 13B-1/ISO 10414-1). Further, such drilling fluid compositions have a filter cake thickness of 0.04-0.05 in, preferably 0.045-0.0499 in, preferably 0.048-0.0498 in per API standard procedure 13B-1 (ANSI/API 13B-1/ISO 10414-1). In contrast, comparative drilling fluids that include de-oiled date pit particles (i.e., not treated with a base) have a filtration water loss volume of 28.1-29.6 mL after 30 min under a pressure of 100 psi according to the same standard (API 13B-1). Therefore, treating de-oiled date pit particles with a base such as sodium hydroxide unexpectedly lowers the filtration water loss volume (mL) of the drilling fluid composition by 6-21%, preferably 7-20%, preferably 8-18% compared to a drilling fluid composition that utilizes de-oiled date pit particles but is otherwise substantially the same. Drilling fluids having such low filtration water loss volumes are particularly advantageous for overbalanced drilling (OBD) operations.

In some embodiments, the drilling fluid compositions contain appropriate amounts of treated date pit particles, which are i) de-oiled and ii) treated with a base and an acid. Such drilling fluids preferably have a filtration water loss volume of 30-40 mL, preferably 31-38 mL, preferably 32-37 mL, preferably 33-36 mL, preferably 34-35 mL after 30 min under a pressure of 100 psi according to American Petroleum Institute (API) standard procedure 13B-1 (ANSI/API 13B-1/ISO 10414-1). In contrast, comparative drilling fluids that include de-oiled date pit particles (i.e., not treated with a base) have a filtration water loss volume of 28.1-29.6 mL after 30 min under a pressure of 100 psi according to the same standard (API 13B-1). Therefore, treating de-oiled date pit particles with a base such as sodium hydroxide and an acid such as acetic acid or sulfuric acid unexpectedly increases the filtration water loss volume (mL) of the drilling fluid composition by 14-85%, preferably 20-80%, preferably 30-75% compared to a drilling fluid composition that utilizes de-oiled date pit particles but is otherwise substantially the same. Drilling fluids having such high filtration water loss volumes are particularly advantageous for underbalanced drilling (UBD) operations.

The ability to adjust the filtration volume loss properties of the drilling fluid compositions herein by simple selection of date pit particle processing procedures is particularly advantageous, with base treatment resulting in drilling fluids having decreased filtration loss properties suitable for OBD operations, and base followed by acid treatment resulting in drilling fluids having increased filtration loss properties which is advantageous for UBD operations. Non-de-oiled (ND) and de-oiled (DO) date pit particles can also provide acceptable drilling fluid, for example in terms of lost circulation materials. However, such drilling fluids containing non-de-oiled (ND) or de-oiled (DO) date pit particles are generally inferior to their treated date pit particle counterparts, particularly in OBD and UBD applications, and the preferred order of use in terms of drilling fluid properties is generally: treated date pit particles (CM)>de-oiled date pit particles (DO)>non-de-oiled date pit particles (ND).

Treated date pit particles have also been found to be superior density reducing agents compared to non-de-oiled and de-oiled date pit particles. For example, drilling fluid compositions that contain treated date pit particles (i.e., either treated with a base or treated with both a base and an acid) have a density of less than 8.6 lb/gal, preferably less than 8.5 lb/gal, more preferably less than 8.4 lb/gal, for example 6.5-8.5 lb/gal, preferably 6.7-8.4 lb/gal, preferably 6.9-8.3 lb/gal, preferably 7.0-8.0 lb/gal, preferably 7.1-7.8 lb/gal. The density measurements are taken with a calibrated mud balance according to the procedure in American Petroleum Institute (API) standard 13B-1 (ANSI/API 13B-1/ISO 10414-1) and reported in terms of pounds per US gallon (lb/gal). In some embodiments, drilling fluids containing treated date pit particles have a density (in lb/gal) that is 3-20%, preferably 4-16%, preferably 5-12% lower than a drilling fluid that is substantially the same except for the presence of de-oiled date pit particles in lieu of the treated date pit particles. Treated date pit particles thus provide drilling fluid compositions having superior density control performance over de-oiled and non-de-oiled counterparts.

In some embodiments, the drilling fluid composition of the present disclosure contains treated date pit particles, and has a plastic viscosity of 3.0-3.5 cP, preferably 3.1-3.4 cP, preferably 3.2-3.3 cP as determined by a direct-indicating viscometer, such as a Fann 6-speed V-G meter, model 35A using a 600 rpm dial reading and a 300 rpm dial reading according to American Petroleum Institute (API) standard procedure 13B-1 (ANSI/API 13B-1/ISO 10414-1). The plastic viscosity is determined by the following equation:

$$\text{Plastic viscosity (PV,cP)} = 600 \text{ rpm} - 300 \text{ rpm reading.}$$

In some embodiments, the treated date pit particles may be further modified (e.g., formed into a composite with an acrylamide-based polymer), or functionalized (e.g., hydrogenated or partially hydrogenated to form fully or partially saturated treated date pits particles). In preferred embodiments, the date pits are not treated or functionalized in a manner other than being i) de-oiled and ii) treated with a base or both a base and an acid, as described later, when formulated into a drilling fluid.

Aqueous Base Fluid

The drilling fluid composition also includes an aqueous base fluid. The aqueous base fluid may refer to any water containing solution, including saltwater, hard water, and fresh water. Drilling muds are ordinarily classified as saltwater muds when they contain over 1% salt (about 6000 ppm of chloride ion). Therefore, for purposes of this description, the term "saltwater" will include aqueous base fluids with a chloride ion content of between about 6000 ppm and saturation, and is intended to encompass seawater and other types of saltwater including groundwater containing additional impurities typically found therein. The term "hard water" will include water having mineral concentrations between about 2000 mg/L and about 300,000 mg/L. The term "fresh water" includes water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the aqueous base fluid is present in an amount of at least 70 wt %, preferably at least 75 wt %, preferably at least 80 wt %, preferably at least 85 wt %, preferably at least 90 wt %, for example 90-95 wt %, preferably 91-94 wt %, preferably 92-93 wt %, relative to a total weight of the drilling fluid composition.

Additive

The presence of treated date pit particles in the drilling fluids provides several advantages as discussed previously, such as for example, control of fluid loss, density reduction, modification of drilling fluid rheological properties, and/or corrosion prevention. When combined in appropriate amounts with a suitable viscosifier in an aqueous base fluid, the resulting drilling fluid possess superior characteristics that make it suitable for multi-purpose drilling applications, while also being able to easily and cost effectively tune the drilling fluid properties by selection of date pit particle treatment processing. As such, in preferred embodiments, the drilling fluid compositions herein are substantially free of one or more additional fluid loss additives, density reducing agents, rheology modifying agents for modification/control of fluid loss, rheology, and/or density properties of the drilling fluid.

However, in some embodiments, the drilling fluid composition includes one or more of a fluid loss additive, a density reducing agent, or a rheology modifying agent, in addition to the treated date pit particles and the viscosifier, in order to provide further control over the drilling fluid properties.

Exemplary fluid loss additives include, but are not limited to, cellulose ethers such as ethyl cellulose and carboxymethyl cellulose, polysaccharides, polyacrylamide, polyvinyl acetate, hydroxypropyl guar, carboxymethyl guar, and carboxymethyl hydroxypropyl guar.

Exemplary density reducing agents include, but are not limited to, nitrogen gas or other gases that are injected into the drilling fluid; hollow microspheres made of glass, ceramics, polymers, etc.; and aerogels such as silica aerogels.

Exemplary rheology modifying agents include, but are not limited to, date pit particles which have not been treated (e.g., non-de-oiled date pit particles, de-oiled date pit particles, etc.); polymers formed from water soluble allylic monomers such as allylic quaternary ammonium salts; and other products derived from agricultural materials (e.g., plants) including products derived from the husks, shells, coir, seeds, flesh, roots, leaves, leaflets, fronds, flowers, fruit, fruit clusters, empty fruit bunches, stalks, stems, and the like from said agricultural materials. Specifically, other products derived from agricultural materials that may act as rheology modifiers include palm-based products, (e.g., palm oil products, palm shell, palm kernels, palm oil fuel ash (POFA), and oil palm shell (OPS)), grass powder or grass ash powder, tree nut-based particles, basil seeds, cotton seeds, corn seeds, watermelon seeds, sunflower seeds, pumpkin seeds, kapok seeds, flax seeds, cattail seeds, cherry pits, wood, nut shell particles, seed shell particles, *psyllium* seed husks, modified starch, and the like.

In some embodiments, the drilling fluid composition optionally includes at least one additive selected from the group consisting of an antiscalant, a thickener, a deflocculant, a lubricant, a buffer, a biocide, and a weighting agent. In preferred embodiments, no additive other than the treated date pit particles and the viscosifier, is present in the drilling fluid compositions. When present, a total weight of the at least one additive in the drilling fluid composition is up to 10 wt %, preferably up to 9 wt %, preferably up to 8 wt %, preferably up to 7 wt %, preferably up to 6 wt %, preferably up to 5 wt %, preferably up to 4 wt %, preferably up to 3 wt %, preferably up to 2 wt %, preferably up to 1 wt %, preferably up to 0.5 wt %, preferably up to 0.1 wt %, preferably up to 0.01 wt %, relative to the total weight of the drilling fluid composition.

In some embodiments, an antiscalant is incorporated as a part of the drilling fluid composition. The term "antiscalant" refers to any chemical agent that prevents, slows, minimizes, or stops the precipitation of scale (e.g. calcium carbonate, calcium sulfate, barium sulfate, strontium sulfate, calcium phosphate, calcium fluoride, calcium silicate, magnesium hydroxide, zinc carbonate, and the like) in the wellbore. For example, in the case of carbonate scale, antiscalants cause the disassociation of the carbonate to produce the oxide and carbon dioxide. Antiscalants which may be used in the present disclosure include inorganic phosphates (e.g., sodium hexametaphosphate, sodium tripolyphosphate, etc.), phosphonic acids (e.g., hydroxyethylidene diphosphonic acid, aminotris(methylenephosphonic acid) (ATMP)), organic monocarboxylic acids (e.g., lactic, acetic, acrylic, formic, glucuronic, stearic, gallic, palmitic, caffeic, glyoxylic, malic, and salicylic acid), polycarboxylic acids (e.g., butane-tricarboxylic acid, maleic acid, itaconic, fumaric, citric, oxalic, adipic, humic, sebacic, fulvic, and tartaric acid), phosphonates, sulfonic acids (e.g., vinyl sulfonic acid, allyl sulfonic acid, etc.), polycarboxylic acid polymers (e.g., polymers containing 3-allyloxy-2-hydroxy-propionic acid monomers), sulfonated polymers (e.g., vinyl monomers having a sulfonic acid group), and the like and mixtures thereof.

In some embodiments, a thickener is present in the drilling fluid composition.

Exemplary thickeners include guar gum, glycol, polyanionic cellulose (PAC), starch, alginic acid (E400), sodium alginate (E401), potassium alginate (E402), ammonium alginate (E403), calcium alginate (E404), agar (E406), carrageenan (E407), locust bean gum (E410), pectin (E440), and Gelatin (E441) and mixtures thereof.

A deflocculant may also be incorporated into the drilling fluid composition. A deflocculant is a chemical additive used to prevent a colloid from coming out of suspension or to thin suspensions or slurries. One type of deflocculant is an anionic polyelectrolyte, such as acrylates (e.g., low molecular weight polyacrylic acids, ethyl acrylate-based polymers), polyphosphates, pyrophosphates (e.g., sodium acid pyrophosphate (SAPP)), polysulfates (e.g., sulfoethyl and/or sulfophenyl acrylamide-based polymers) lignosulfonates (Lig) or tannic acid derivates such as Quebracho.

The drilling fluid composition may also include a lubricant, such as an oil, for lubrication. The lubricant may be a synthetic oil or a biolubricant, such as those derived from plants and animals for example vegetable oils. Synthetic oils include, but are not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include canola oil, castor oil, palm oil, sunflower seed oil and rapeseed oil from vegetable sources, and Tall oil from tree sources, and the like.

The drilling fluid compositions of the present disclosure may also be formulated to include a buffer for adjusting/controlling the pH of the drilling fluid and/or fluid located within the wellbore. Exemplary buffers include, but are not limited to, monosodium phosphate, disodium phosphate, sodium tripolyphosphate, and the like.

A biocide may also be present in the drilling fluid formulations to kill or prevent bacteria from growing in the drilling fluid and/or within the geological formation. Exemplary biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and 2-bromo-2-nitro-1,3-propane diol.

The drilling fluid composition may also include a weighting agent without adversely affecting its stability or other properties in order to maintain sufficient bottom hole pressure in the wellbore to prevent an influx of formation fluids. Exemplary weighting agents include calcium carbonate (chalk), barite, sodium sulfate, hematite, siderite, ilmenite, and combinations thereof.

Method of Making the Drilling Fluid

According to a second aspect, the present disclosure relates to a method of making the drilling fluid composition. Initially, date pits may be obtained, for example, the date pits may be produced as a waste by-product from date processing, and the date pits may be obtained from date processing plants to provide a sustainable source of the date pits. Moreover, local sources of date pits may reduce the cost of imported date pit products. In some embodiments, the date pits may be obtained from the species *phoenix dactylifera*. It should be appreciated that, in some embodiments, the date pits may be obtained from genetically modified date palms (that is, genetically modified organisms (GMOs)).

The obtained date pits are preferably subject to further processing shortly after they are obtained to minimize degradative decomposition due to natural enzymatic reactions as well as growth of bacteria. To process, the obtained date pits may be optionally soaked or washed with water, preferably soaked and/or sonicated in water to release any adhering dirt and/or date flesh. For example, the obtained date pits may be soaked and/or sonicated in water for at least about 5, at least about 10 minutes, at least about 30 minutes, at least about an hour, and up to about 48 hours, up to about 24 hours, up to about 10 hours, up to about 5 hours. In some embodiments, the date pits may be dried using a sun drying process over a 1-12 hour, 2-10 hour, or 3-8 hour time period, or alternatively, they may be dried in an oven at 150-300° C., 175-280° C., or 200-260° C. to provide an acceptable moisture content as described previously (e.g., 0.01-5 wt % moisture content).

Next, the date pits may be ground to an appropriate particle size (e.g., less than 200 µm) and roundness (e.g., sub-angular) as described previously using a suitable grinder (e.g., an industrial grinder) to form dried date pit particles (also referred to as non-de-oiled date pit particles (ND)). In some embodiments, the date pits may be crushed before being ground. For example, in such embodiments, the date pits may be crushed to a first size, and the crushed date pits may be ground to a second size smaller than the first size. The non-de-oiled date pit particles may be optionally sifted using one or a plurality of sieves with varying sieve openings for selection of a desired particle size. For example, the non-de-oiled date pit particles may be filtered using a series of sieves with decreasing sieve size openings until a desired particle size is obtained.

The non-de-oiled date pit particles may then be de-oiled by contacting with an organic solvent to remove oils and form the de-oiled date pit particles. Exemplary organic solvents which can be used to de-oil the dried date pit particles include, but are not limited to, ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme), alcohols (e.g. methanol, ethanol, trifluoroethanol, n-propanol, i-propanol, n-butanol, i-butanol, t-butanol, n-pentanol, i-pentanol, 2-methyl-2-butanol), aromatic solvents (e.g. benzene, o-xylene, m-xylene, p-xylene, and mixtures of xylenes, toluene, mesitylene, anisole, 1,2-dimethoxybenzene), chlorinated solvents (e.g. chlorobenzene, dichloromethane, 1,2-dichloroethane, 1,1-dichloroethane, chloroform, carbon tetrachloride), ester solvents (e.g. ethyl acetate (EtOAc), propyl acetate), ketones (e.g. acetone, butanone), alkane solvents (e.g. pentane, cyclopentane, hexanes, cyclohexane, heptanes, cycloheptane, octanes), acetonitrile, and mixtures of one or more of these organic solvents. In preferred embodiments, the organic solvent is an alkane solvent or an alcohol solvent, preferably the organic solvent is at least one selected from the group consisting of pentane, hexane, methanol, and ethanol. Most preferably the organic solvent is hexane.

Any amount of organic solvent can be used for the de-oiling procedure so long as an acceptable amount of fat content (e.g., fatty material such as fatty esters, fatty hydrocarbon oils) is removed to provide the de-oiled date pit particles as discussed heretofore. A typical volume ratio of the organic solvent to the non-de-oiled date pit particles used for the de-oiling procedure ranges from 2:1 to 50:1, or 3:1 to 40:1, or 5:1 to 30:1, or 8:1 to 20:1, or 10:1 to 15:1. The de-oiling procedure may be performed by methods known to those of ordinary skill in the art. For example, the dried date pit particles may be immobilized onto a filter or inside a cartridge filter and the organic solvent (which may optionally be at elevated temperature) may be passed through.

Alternatively, the dried date pit particles may be mixed with the organic solvent in a vessel with optional heating and/or stirring and then filtered to recover the de-oiled date pit particles. In preferred embodiments, the dried date pit particles are extracted with the organic solvent using a continuous extraction process in an extraction apparatus, for example, a Soxhlet extractor or a Kumagawa extractor at the boiling temperature of the organic solvent employed. For example, the fat content of non-de-oiled date pit particles may be reduced to acceptable levels described previously by refluxing hexane (boiling point of 68.5-69.1° C. at standard pressure) in a Soxhlet extractor, or other continuous extractor apparatus, containing the non-de-oiled date pit particles, thereby forming de-oiled date pit particles.

To form the treated date pit particles, the de-oiled date pit particles are mixed with a base and water to form an alkaline mixture, and the alkaline mixture is optionally agitated, for example in a shaker, for up to an hour, or up to 45 minutes, or up to 30 minutes, or up to 15 minutes or until the base has completely dissolved. Typically, a concentration of the base in water ranges from 0.5-6 M, preferably 1-5 M, preferably 1.5-4 M, preferably 2-3 M. In some embodiments, a weight ratio of the base to the de-oiled date pit particles ranges from 5:1 to 1:3, preferably 4:1 to 1:2, preferably 3:1 to 1:1.5, preferably 2:1 to 1:1.2. In some embodiments, a pH of the alkaline solution is 9-15, preferably 10-14.5, preferably 11-14, preferably 12-13.5. Bases that are suitable for treating the de-oiled date pit particles include hydroxide bases such as an alkali metal hydroxide, an alkali earth metal hydroxide, and/or an ammonium hydroxide. For example, the base may be one or more of lithium hydroxide, sodium hydroxide, potassium hydroxide, rubidium hydroxide, cesium hydroxide, magnesium hydroxide, calcium hydroxide, strontium hydroxide, barium hydroxide, and/or a hydroxide salt of an ammonium cation (e.g., protonated forms of ammonia, methylamine, dimethylamine, trimethylamine, ethylamine, diethylamine, triethylamine, diisopropylethylamine, piperidine, N-methylpiperidine, 2,2,6,6-tetramethylpiperidine, morpholine, N-methylmorpholine, monoethanolamine, diethanolamine, triethanolamine, and the like). In preferred embodiments, the base is sodium hydroxide.

After forming the alkaline mixture, the alkaline mixture is next subjected to a freeze/thaw process to form a freeze/thaw mixture comprising the treated date pit particles in water. In one example, the freeze thaw process may involve:

1) subjecting the alkaline mixture to a temperature of 0° C. or below, preferably −10° C. or below, preferably −20° C. or below, preferably −30° C. or below, preferably −40° C. or below for at least 1 hour, at least 2 hours, at least 3 hours, at least 4 hours, at least 5 hours, at least 6 hours, or any other conditions suitable for freezing the alkaline mixture to form a frozen mixture;

2) thawing the frozen mixture at a temperature of 20-50° C., preferably 21-45° C., preferably 22-40° C., preferably 23-35° C. using standard atmospheric conditions or under applied heat such as a heating bath (e.g., heated water bath) or using heating circulators to thaw the frozen mixture and form a freeze/thaw mixture in liquid state. The time period for the thawing is dependent on the operation scale and the temperature conditions employed, but typically ranges from 30 minutes to 4 hours, or 1-3 hours; and 3) optionally agitating the freeze/thaw mixture for at least 15 minutes, at least 30 minutes, at least 45 minutes, at least 1 hour, and up to 3 hours, optionally under continued heating, to ensure melting of all frozen clumps and complete reformation to a liquid state. The freeze/thaw mixture can be agitated by shaking in a shaker apparatus, stirring using a mechanical stirrer or magnetic stirrer, or by flowing forces such as by pumping the freeze/thaw mixture through a circulator pump.

In some embodiments, the date pit particles which have been treated with a base as described above are taken on and formulated into a drilling fluid composition. In other embodiments, the date pit particles which have been treated with a base as described above are next treated with an acid by adding an acid to the freeze/thaw mixture produced after thawing or after/during the optional agitating step. In embodiments where it is desirable to formulate drilling fluid compositions having a relatively high filtration water loss volume (mL) and relatively low density, for example for use in underbalanced drilling (UBD) operations, the acid treatment step is preferably employed. It is clear that treating date pit particles with an acid has an influence of the resulting drilling fluid properties, in particular filtration fluid loss, compared to date pit particle treatment with base alone in a freeze/thaw process, as discussed throughout this disclosure. This difference may be attributed to modification of the drilling fluid pH, or it may be attributed to a chemical modification of the treated date pit particles themselves, with acid treatment resulting in partial degradation or modification of the date pit particle structure.

When the date pit particles are treated with both a base and an acid, enough acid is preferably added to the freeze/thaw mixture to neutralize/acidify the pH to a value of 2-8, preferably 3-7, preferably 4-6. In some embodiments, a molar ratio of the acid to the base employed during the treatment process ranges from 8:1 to 1:1, preferably 6:1 to 1.5:1, preferably 4:1 to 2:1, preferably 3:1 to 2.5:1. The acid employed may be an inorganic acid or an organic acid. Exemplary inorganic acids which can be used to treat the date pit particles include, but are not limited to, hydrochloric acid, nitric acid, phosphoric acid, sulfuric acid, hydrobromic acid, perchloric acid, and hydroiodic acid. Organic acids which can be used herein include alkanoic acids having 1 to 8 carbon atoms, hydroxycarboxylic acids having 2 to 10 carbon atoms, dicarboxylic acids having 2 to 10 carbon atoms, tricarboxylic acids having 4 to 10 carbon atoms, organosulfonic acids, and organophosphonic acids. Suitable organic acids include acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, and the like, as well as mixtures thereof. Preferred organic acids have a solubility in water of at least 50% by volume. In preferred embodiments, the acid used to treat the date pit particles is acetic acid or sulfuric acid. The acid may be added as an aqueous solution or neat (e.g., glacial form when acetic acid is employed, or concentrated/fuming form when sulfuric acid is employed).

After treating the de-oiled date pit particles with a base or both a base and an acid as described above to form a freeze/thaw mixture that contains the treated date pit particles in water, an appropriate amount of the freeze/thaw mixture is then combined with the viscosifier, the aqueous base fluid, and any optional additive, to form the drilling fluid compositions herein. Thorough mixing may be performed to avoid creating lumps or "fish eyes," for example, by stirring the resulting drilling fluid composition with a stirring speed of 1-800 rpm, or 2-700 rpm, or 3-600 rpm. In some embodiments, when the viscosifier is bentonite, the various ingredients of the drilling fluid composition are mixed for a sufficient period of time to allow for hydration of the bentonite clay in the aqueous base fluid, and this period of time is usually between about 5 and about 60 minutes, preferably between about 10 and about 40 minutes, preferably between about 20 and about 30 minutes. Other mixing times may be also utilized to make the drilling mud composition (e.g. less than 5 minutes, or more than 60 minutes) so long as the drilling fluid composition is substantially free of lumps.

In some embodiments, the pH of the drilling fluid composition may be adjusted depending on the drilling application or problems that may be encountered during a drilling operation. For example, the pH of the drilling fluid composition may be adjusted so as to provide for increased solubility of the various organic components in the fluid composition such as organic components from the date pit particles (e.g., treated date pit particles) or one or more additives (e.g., the antiscalant, the thickener, etc.), for preventing acid promoted damage/corrosion to drilling equipment, for minimizing scale formation, etc. In some embodiments, the pH of the drilling fluid is preferably between about 8 and 12, preferably 9 and 11. In some embodiments, the pH of the drilling fluid composition is between about 1 and 8, preferably 2 and 7, more preferably 3 and 6. The pH may be adjusted using one or more of the aforementioned acids or bases, or buffers known to those of ordinary skill in the art (e.g. monosodium phosphate, disodium phosphate, sodium tripolyphosphate, etc.).

Process for Drilling a Subterranean Geological Formation

According to a third aspect, the present disclosure relates to a process for drilling a subterranean geological formation, involving drilling the subterranean geological formation with a drill bit to form a wellbore, and injecting the drilling fluid composition into the subterranean geological formation through the wellbore.

The drilling fluids of the present disclosure are multipurpose and can be used for a variety of drilling operations in a variety of types of wells. For example, the drilling fluids disclosed herein may be injected into new wells, wells with good or poor production, vertical wells, slanted wells, horizontally drilled wells, and more. The "wellbore" as used herein may be drilled into any geological structure or formation that may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and water. Exemplary non-condensable gases include hydrogen, carbon monoxide, carbon dioxide, methane, and other light hydrocarbons.

In some embodiments, the method further comprises circulating the drilling fluid composition within the wellbore after the injecting, for example, for at least 30 minutes, at least 45 minutes, at least an hour, and up to 5 hours, or up to 3 hours.

In some embodiments, the drilling fluid composition includes at least one additive selected from the group consisting of an antiscalant, a thickener, a deflocculant, a lubricant, a buffer, a biocide, and a weighting agent. In an alternative embodiment, the at least one additive, when employed, may be injected into the geological formation as a separate component from the drilling fluid composition.

In some embodiments, the drilling fluids may by employed in overbalanced drilling operations. In conventional or "overbalanced" drilling (OBD), drilling fluid is pumped into the well shaft at pressure higher than in the reservoir. This keeps the oil and gas, for example, in the reservoir during drilling. The pressures in the wellbore during drilling and drilling fluid injection can vary widely depending on the depth of the well, the type of reservoir, and many other factors. In some embodiments, the drilling fluid is injected at a pressure sufficient to maintain a positive pressure differential within the wellbore (i.e., drilling fluid pressure minus formation pressure) of at least 10 psi, at least 20 psi, at least 30 psi, at least 40 psi, at least 50 psi, at least 100 psi, at least 300 psi, at least 500 psi, at least 1,000 psi, and up to 3,000 psi, up to 2,500 psi, or up to 2,000 psi, or up to 1,500 psi across all depths of the wellbore (e.g., depths from 5,000-14,000 feet). The pressure within the wellbore can be measured and adjusted using techniques known to those of ordinary skill in the art, for example techniques disclosed in U.S. Pat. No. 9,725,974B2, U.S. Pat. No. 9,328,573 B2 and U.S. Pat. No. 6,367,566B1, each incorporated herein by reference in its entirety.

To achieve acceptable pressures, the drilling fluid is circulated and remains in the wellbore (down the drill pipe and back up the annulus) in order to control and prevent caving of the wellbore. However, due to the pressures in the wellbore, fluid loss is a common occurrence in these drilling operations. In some situations when the borehole penetrates a fracture in the formation through which most of the drilling fluid may be lost, the rate of loss may exceed the rate of replacement. Drilling operations may have to be stopped until this zone is sealed and fluid loss to the fracture is reduced to an acceptable level. This phenomenon of losing the drilling fluid to the formation is referred to as lost circulation. In overbalanced drilling, loss of drilling fluid to the formation is undesirable as it (1) leads to poor circulation and therefore less efficient removal of cuttings, (2) requires additional cost in rig time, manpower and material to replenish the lost mud and restore circulation and in extreme cases, (3) leads to insufficient downhole hydrostatic pressure which may lead to a blowout.

In attempts to compensate for fluid loss, drilling fluids used in overbalanced drilling are designed to form a thin, low permeability filter cake (mud cake) over time that seals openings in formations to reduce the unwanted influx of fluids into permeable formations. A mud cake forms when the drilling fluid contains particles that are approximately the same size as or have diameters greater than about one third of the pore diameter (or the width of any opening such as induced fractures) in the formation being drilled. Even with the formation of a mud cake, fluid loss may still be an issue and fluid loss control additives are used. Therefore, when the process herein involves overbalanced drilling (i.e. where the drilling fluid composition is injected into the subterranean geological formation through the wellbore to maintain a pressure in the wellbore that is higher than a static pressure of the subterranean geological formation), drilling fluids containing the treated date pit particles which are ii) treated with a base are preferably utilized herein, since these drilling fluids possess advantageous filtration water loss properties and advantageous density properties as discussed previously, which makes them well-suited for these types of drilling processes.

In some embodiments, the drilling fluids may be employed in underbalanced drilling (UBD) operations where the pressure in the wellbore is kept lower than the static fluid pressure in the formation being drilled. As the well is being drilled, formation fluid flows into the wellbore and up to the surface. In some embodiments, the drilling fluid is injected at a pressure sufficient to maintain a negative pressure differential within the wellbore (i.e., drilling fluid pressure minus formation pressure) of from −10 psi, from −20 psi, from −30 psi, from −40 psi, from −50 psi, from −100 psi, from −300 psi, from −500 psi, from −1,000 psi, and up to −3,000 psi, up to −2,500 psi, or up to −2,000 psi, or up to −1,500 psi across all depths of the wellbore (e.g., depths from 5,000-14,000 feet). The pressure within the wellbore can be measured and adjusted using techniques known to those of ordinary skill in the art, for example techniques disclosed in U.S. Pat. No. 9,725,974B2, U.S. Pat. No. 9,328,573 B2 and U.S. Pat. No. 6,367,566B1, each incorporated herein by reference in its entirety.

This type of drilling process may employ a "rotating head" at the surface, which acts as a seal that diverts produced fluids to a separator while allowing the drill string to continue rotating. Separating produced fluids at the surface can be costly, and thus low-cost drilling fluids are often employed to help offset these expenses. Production often commences earlier in UBD than in OBD, and thus it is advantageous to use drilling fluids which form a more porous filter cake with a higher filtrate volume. Therefore, when the process involves underbalanced drilling (i.e. where the drilling fluid composition is injected into the subterranean geological formation through the wellbore to maintain a pressure in the wellbore that is lower than a static pressure of the subterranean geological formation), drilling fluids containing the treated date pit particles which are ii) treated with a base and an acid are preferably utilized herein, since these drilling fluids possess increased filtration water loss properties and advantageous density properties, which makes them well-suited for UBD processes.

Alternatively, the drilling fluid compositions may be utilized in balanced differential pressure drilling operations, whereby the drilling fluids herein are injected into the wellbore at pressures sufficient to match the formation pressure (i.e., the drilling fluid pressure is approximately equal to the formation pressure).

In some embodiments, the drilling fluid compositions herein may be utilized for fracking processes. "Fracking" or "fracturing" as used herein refers to the process of initiating and subsequently propagating a fracture of the rock layer by employing the pressure of a fluid as the source of energy. In some embodiments, fracking is accomplished by pumping in liquids at high pressure. A hydraulic fracture may be formed by pumping a fracturing fluid (i.e. the drilling fluid composition, in one or more of its embodiments) into the wellbore at a rate sufficient to increase the pressure downhole to a value in excess of a critical fracture pressure associated with the formation rock. The pressure causes the formation to crack, allowing the fracturing fluid to enter and extend the crack farther into the formation. Following fracking by high pressures, the fractured formation allows more hydrocarbons (e.g., methane, condensate, ethane, oil) and/or water to be extracted since the formation walls are more porous. In some embodiments, the drilling fluid composition is injected into the subterranean geological formation through a wellbore at a pressure of at least 5,000 psi, at least 5,500 psi, at least 6,000 psi, at least 6,500 psi, at least 7,000 psi, at least 7,500 psi to fracture the underground geological formation and form fissures in the underground geological formation.

The process may further include injecting a proppant into the wellbore to maintain the structural integrity of the wellbore. A "proppant" is used herein to refer to any granular material that, in an aqueous mixture, can be used to fracture the rock formation and to provide structural support to the wellbore and/or fissures that develop in the rock formation due to pressurizing the rock formation during fracking. In some embodiments, the proppant is one or more of grains of sand, ceramic, silica, quartz, or other particulates that prevent the fractures from closing when the injection is stopped.

In some embodiments, the drilling fluid compositions herein may be useful completion fluids. Completion of a well refers to the operations performed during the period from drilling in the pay zone until the time the well is put into production. These operations may include additional drilling, placement of downhole hardware, perforation, sand control operations, such as gravel packing, and cleaning out downhole debris. A completion fluid is often defined as a wellbore fluid used to facilitate such operations. The completion fluid's primary function is to control the pressure of the formation fluid by virtue of its specific gravity. The type of operation performed, the bottom hole conditions, and the nature of the formation will dictate other properties, such as viscosity. The drilling fluids of the present disclosure may thus be used in drilling completion processes, for example, to assist in cleaning out the drilled borehole, further drilling operations, to place downhole hardware, and to control and maintain a desired downhole pressure.

The examples below are intended to further illustrate protocols for preparing and characterizing the treated date pit particles and the drilling fluid compositions, and are not intended to limit the scope of the claims.

EXAMPLES

Materials

Commercial bentonite (Alumino Silicate Hydrate Montmorillonite) was used as the base material for preparing the water-based drilling formulation. Date pit used in this study was collected from date from a household in Eastern Province of Saudi Arabia. NaOH (Merck) and distilled water were used as the solvent for the experiments.

Date Pit Processing

The Date seed were soaked in water, washed by sonication to free them from any adhering date flesh and then dried. Drying can be done under the sun or in an oven. The dried seeds were ground to a powder and de-oiled using hexane in a Soxhlet apparatus. Other solvents such as pentane, ethanol or methanol can also be used.

Preparation of Modified Date Pit—Based Drilling Fluid Additive

A predetermined amount of solvent was prepared as mixed solution of 2.5 g of NaOH in 29 mL of $H_2O$. A desired amount of the de-oiled date pit powder was immersed into the solvent and agitated for 30 minutes using a Multi-Wrist shaker. There will be a slight increase in temperature. Thus, the container needs to be first slightly agitated manually. In addition, it should be opened intermittently to discharge the accumulated pressure above the solution. This should be done until a complete dissolution of NaOH pellets is observed.

The mixture was placed in the deep freezer for 4 hours at −20° C. to freeze. The frozen mixture was removed and then defrosted. Defrosting can be under atmospheric conditions or in water. Once completely defrosted, the mixture was shaken for at least 30 minutes. Using this procedure, various concentrations of formulation were prepared. Compositions of these formulations are contained in Table 2.

TABLE 2

The composition of the date pit-based polymeric additive

| Sample # | Sample name | Water (g) | Date Pit (g) | NaOH (g) |
|---|---|---|---|---|
| 1 | PB | 0.0 | 0.00 | 0.0 |
| 2 | NaPB | 26.9 | 0.00 | 2.5 |

TABLE 2-continued

The composition of the date pit-based polymeric additive

| Sample # | Sample name | Water (g) | Date Pit (g) | NaOH (g) |
|---|---|---|---|---|
| 3 | 1.50DP | 26.9 | 1.50 | 2.5 |
| 4 | 3.00DP | 26.9 | 3.00 | 2.5 |

PB: Formulation containing only Pure Bentonite (no additive included);
NaPB: formulation containing Pure Bentonite and NaOH (The only additive is NaOH).

Evaluation of the Date Pit—Based Drilling Fluid Additive

The ensuing formulations prepared using the date pit powder were evaluated by measuring their properties at specific temperature.

Drilling Fluid Formulation

Date pit particles/bentonite drilling fluid formulation was prepared by mixing 20.0 g mixture of bentonite and date particles with water.

Density Measurement

A calibrated mud balance with accuracy of 0.1 lb/gal was used as the density-measuring device for the drilling fluids. The procedure followed is based on the API procedures for density measurement. Drilling fluid is poured into the fluid holding cup and covered with the screw-on lid and then balanced by a fixed counterweight at the other end. Density reading is taken when the level-bubble on the beam is accurately balanced.

Rheological Properties of Drilling Fluids

The viscometer was used to determine the rheological properties as per API procedures.

Filtration Properties/Fluid Loss Control Measurement

Filtration experiments were carried out on drilling fluids at laboratory conditions to determine the filtration loss volume and cake thickness. The filter press was used with nitrogen gas providing the necessary pressure. Drilling fluid was stirred and poured into the cell fitted with filter paper underneath. The assembly was mounted on the filter press and graduated cylinder was placed under drain tube to receive filtrate. 100 psi pressure was applied and test period was started at the same time. The filtrate volume was recorded for 30 min.

Drilling Fluid Formulation Performance with and without Additive

The results displayed in Table 3 shows the potential of the formulation in controlling the density, and the fluid loss. There is a continuous increase in the performance of the formulation with an increase in the amount of chemically modified date pit that was dispersed within the matrix. The density reduced by about 14% with the addition of 3 g of the modified sample as compared to the formulation containing only the pure bentonite. The plastic viscosity also increases with increase in the quantity of additive dispersed into the formulation. In a similar manner, the filtration properties were observed to increase with an increase in the amount of additive. For example, the fluid loss control properties increased by 35% and 54% in terms of filtrate volume and cake thickness, respectively, as compared with the pure bentonite formulation.

TABLE 3

Performance of Drilling Fluid Formulation

| Sample # | Density (lb/gal) | Plastic Viscosity (cP) | Volume of water after 30 mins (mL) | residue thickness (in) |
|---|---|---|---|---|
| 1 | 8.60 | 4.305 | 26.80 | 0.1085 |
| 2 | 8.60 | 3.327 | 20.20 | 0.0499 |
| 3 | 7.70 | 3.131 | 18.20 | 0.0485 |
| 4 | 7.43 | 3.327 | 17.40 | 0.0498 |

Chemical Comparison of Non-De-Oiled, De-Oiled, and Treated Date Pit Particles

Date pit is a multicomponent naturally occurring polymer. Most of the components of date pit are not soluble in water. However, water-based drilling fluid formulation is better improved by adding materials that are water soluble. Thus some initial pretreatment and further chemical modifications are needed to enhance performance properties of date pit and improve its purity. The original date pit is different from the chemically modified version as disclosed herein. FTIR analysis was performed on three different date samples based on the different treatment stages:

i. Non-Deoiled (ND): Date pit particles before pretreatment using organic solvent ii. Deoiled (DO): Date pit particles obtained after the organic solvent treatment iii. Chemically Modified (CM): Date pit particles produced from the freeze/thaw process.

FIG. 1 showed the FTIR spectrum of various samples before and after treatment. The FIGURE revealed that the chemically modified date pit is different from the initial pit. It was observed that some of the date pit components (such esters, lipids, etc) were removed by the organic solvent treatment. The removal of these components is needed to improve the processability of the date pit. By comparing the spectrum of DO and CM, it was also observed that some of the components of DO samples have been modified due to the disappearance as well as shifting of some peaks of DO when compared to CM.

In terms of performance, the chemically modified particle is better as a density reducing agent. It is also better with respect to fluid loss control property than the unmodified particle. See Table 5 for comparison of the performance of DO (Example 3) and CM (Example 4).

Examples 1-4

Varieties of formulations were prepared as examples to demonstrate the potential of the additive for application in both the overbalance and the underbalance drilling operations. Table 4 and 5 contain the composition of four formulations with the NaOH modified and non-modified (DO) date pit additives. The results from these tables revealed a decrease in both the density and the filtrate volume. The observed decrease is more pronounced for the modified samples than the non-modified ones. For instance in Table 5, for drilling fluid formulations containing 5 mL each of the modified (CM) (Example 4) and non-modified (DO) (Example 3) additive, the density of Example 4 additive is 9% lower than that of Example 3. Similarly, the filtrate volume of Example 4 is 21% less when compared with that of Example 3 (the formulation containing the non-modified (DO) date pit particles).

TABLE 4

Examples 1 and 2

| Sample Name | Bentonite (g) | Water (mL) | Additive (mL) Non-Modified | Additive (mL) NaOH Modified | Density (lb/gal) | Filtrate Volume (mL) |
|---|---|---|---|---|---|---|
| Example 1 | 20.0 | 350 | 2.00 | — | 8.62 | 29.6 |
| Example 2 | 20.0 | 350 | — | 2.00 | 8.35 | 27.8 |

TABLE 5

Examples 3 and 4

| Sample Name | Bentonite (g) | Water (mL) | Additive (mL) Non-Modified | Additive (mL) NaOH Modified | Density (lb/gal) | Filtrate Volume (mL) |
|---|---|---|---|---|---|---|
| Example 3 | 20.0 | 350 | 5.00 | — | 8.60 | 28.1 |
| Example 4 | 20.0 | 350 | — | 5.00 | 7.80 | 22.2 |

Examples 5-7

For UBD where the pore pressure should be higher than the mud pressure, the formation fluid is allowed to flow into the wellbore. For this reason, production often commences earlier in UBD than OBD. Consequently, the filter cake should be more porous with higher filtrate volume. The addition of few drops of acid neutralizes the pH of the solution and also increases the filtrate volume as shown on Tables 6, 7 and 8. Two types of acid: weak (acetic acid) and strong (sulfuric) acid were used. The results in these tables show that the addition of these acids increased the potential of the new additives in application for underbalance drilling. As shown in Table 6, using 2 mL of this acetic acid modified additive gave rise to 15% increase in filtrate volume and 7% decrease in the density (compared to non-modified (DO) additive) which is an indication of better performance in underbalance drilling. On a similar note, using 10 mL of $H_2SO_4$ modified additive led to a better underbalance drilling fluid by 83% increase and 9% decrease in terms of filtrate volume and density, respectively.

TABLE 6

Example 5

| Sample Name | Bentonite (g) | Water (mL) | Additive (mL) Non-Modified | Additive (mL) NaOH/Acid Modified | Density (lb/gal) | Filtrate Volume (mL) |
|---|---|---|---|---|---|---|
| Example 1 | 20.0 | 350 | 2.00 | — | 8.62 | 29.6 |
| Example 5 | 20.0 | 350 | — | 2.00[A] | 8.00 | 34.00 |

[A] Acetic Acid

TABLE 7

Example 6

| Sample Name | Bentonite (g) | Water (mL) | Additive (mL) Non-Modified | Additive (mL) NaOH/Acid Modified | Density (lb/gal) | Filtrate Volume (mL) |
|---|---|---|---|---|---|---|
| Example 3 | 20.0 | 350 | 5.00 | — | 8.60 | 28.1 |
| Example 6 | 20.0 | 350 | — | 5.00[A] | 7.10 | 35.20 |

[A] Acetic Acid

TABLE 8

Example 7

| Sample Name | Bentonite (g) | Water (mL) | Additive (mL) NaOH Modified | Additive (mL) NaOH/Acid Modified | Density (lb/gal) | Filtrate Volume (mL) |
|---|---|---|---|---|---|---|
| 1.50DP | 20.0 | 350 | 10.00 | — | 7.70 | 18.0 |
| Example 7 | 20.0 | 350 | — | 10.00[H] | 7.00 | 33.00 |

[H] $H_2SO_4$

In all cases, the trends of the results revealed a continuous improvement beyond the experimental measurement conditions. Clearly, these results show that chemical modification of date pit particles can successfully be used to produce a multifunctional date-pit based drilling fluid additive that could serve as density reducing and fluid loss control agents during drilling operations.

Example 8

The drilling fluid was prepared by mixing 20.0 g of bentonite and date pit particles. Table 9 contains the weight percent of each component of the drilling fluid formulation.

TABLE 9

Percent weight composition of drilling fluid formulation

| Sample Name | Water (% wt) | Bentonite (% wt) | DP Additive (% wt) |
|---|---|---|---|
| PB | 94.59 | 5.41 | 0.00 |
| *NaPB | 92.11 | 5.26 | — |
| 1.50DP | 92.11 | 5.26 | 2.63 |
| Example 1, 2&5 | 94.09 | 5.38 | 0.54 |
| Example 3, 4&6 | 93.33 | 5.33 | 1.33 |
| Example 7 | 92.11 | 5.26 | 2.63 |
| 3.00DP | 92.11 | 5.26 | 2.63 |

'PB' stands for 'Pure Bentonite'. This indicates that the drilling fluid sample made from this PB additive contains only pure bentonite, with no date pit and NaOH added. That is, no additive was added in this case. Similarly,
'NaPB' stands for 'NaOH and Pure Bentonite', indicating that its corresponding drilling fluid contains NaOH in addition to Pure Bentonite.
*The % wt balance of 2.63 is the percentage of NaOH added to this sample in order to use it as a control to ensure that the change observed was actually coming from modified Date Pit particles but not from NaOH.

The invention claimed is:

1. A process for making a drilling fluid composition and drilling a subterranean geological formation, comprising:
    first contacting dried date pit particles with an organic solvent to remove oils and form de-oiled date pit particles;
    mixing the de-oiled date pit particles with NaOH and water to form an alkaline mixture;
    subjecting the alkaline mixture to a freeze/thaw process and optionally adding an acid to form a freeze/thaw mixture comprising the treated date pit particles in water; and mixing the freeze/thaw mixture with bentonite and an aqueous base fluid to form the drilling fluid composition which comprises:
  the bentonite;
  the treated date pit particles, and
  the aqueous base fluid;
  wherein the treated date pit particles are present in an amount of 0.01-5 wt %, relative to a total weight of the drilling fluid composition; then
drilling the subterranean geological formation with a drill bit to form a wellbore while injecting the drilling fluid composition into the subterranean geological formation through the wellbore.

2. The process of claim 1, wherein the drilling fluid composition is injected into the subterranean geological formation through the wellbore to maintain a pressure in the wellbore that is higher than a static pressure of the subterranean geological formation.

* * * * *